Patented Apr. 20, 1937

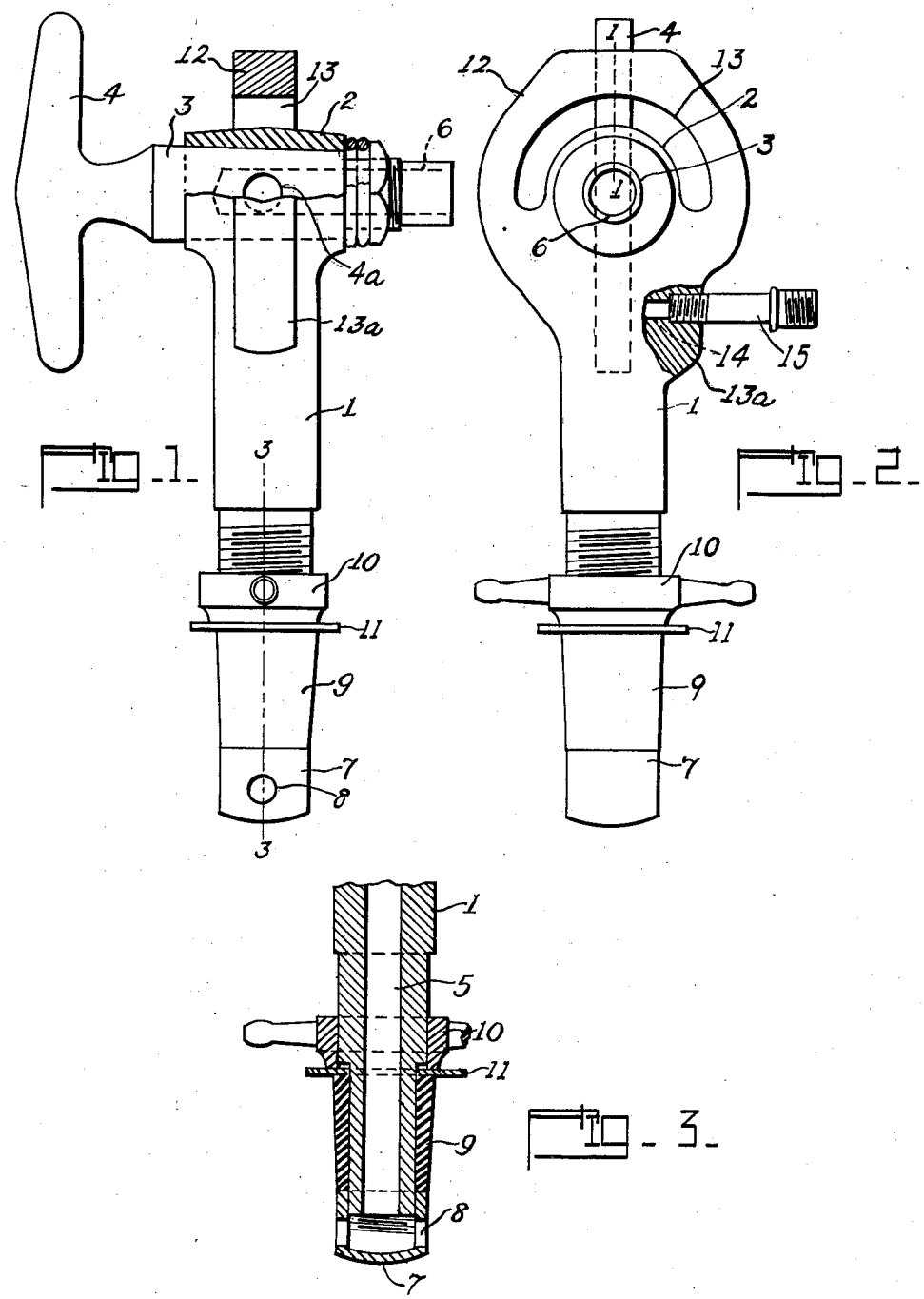

2,077,718

UNITED STATES PATENT OFFICE 2,077,718

BEVERAGE FAUCET

Jacob Schreier, Detroit, Mich.

Application June 4, 1934, Serial No. 729,020

4 Claims. (Cl. 225—43)

This invention relates to faucets and particularly to beverage faucets.

In applying a faucet to a keg or other container for a charged beverage, it is a common 5 practice to drive the faucet into the bung hole and thereby drive the bung into the keg. Thus the bung hole is closed by the faucet almost coincidently with removal of the bung, so that any appreciable loss of pressure or escape of the beverage is avoided.

Since the bungs usually tightly fit the bung hole, it is generally necessary to subject the faucet to heavy blows in order to dislodge the bung. The outer end of a drive faucet ordinarily encases a valve member rotative about an axis transverse to the faucet stem, and it has been found in many cases that the heavy blows employed to drive a metal faucet have distorted either the valve member or its casing and caused undue binding of said member.

An object of the invention is to form a metal faucet with an anvil portion to receive the driving blows, and adapted to transmit the impact thereof to the faucet stem without imposing a distorting force upon either the valve member or its casing.

Another object is to provide on the free end of a faucet stem a cap providing an imperforate impact face for engagement with a bung and having lateral inlets to the beverage passage of the stem.

A further object is to use such cap as an abutment for one end of a rubber sleeve, embracing the lower portion of the faucet stem, and to provide for an endwise compression of the sleeve against the cap to circumferentially expand the sleeve, so that it may properly fit a bung opening.

These and various other objects the invention attains by the construction hereinafter described, and illustrated in the accompanying drawing, wherein:

Fig. 1 is a side elevational view of the improved faucet, partially in section on the line 1—1 of Fig. 2.

Fig. 2 is an end elevational view thereof.

Fig. 3 is an axial sectional view of the lower portion of the faucet, taken on the line 3—3 of Fig. 1.

In these views, the reference character 1 designates an elongated tubular stem and 2 a head integrally surmounting said stem and forming a casing for a tapered valve member 3. The latter is transverse to the stem with its axis intersecting that of the stem, and its ends projecting from the casing. One of said ends carries a handle 4 for actuating the valve member and the other forms an outlet. The mid-portion of the valve member is transversely formed with a port 4a adapted to establish a regulable communication between the inlet passage 5 of the stem and the outlet passage 6 of the valve member.

Threaded upon the free end of the stem is a cap 7, formed with one or more lateral openings 8 for admitting a beverage to the passage 5. Said cap provides an imperforate impact surface to engage a bung or the like (not shown), in driving the same into a keg, and prevents clogging of the stem by the bung or any broken particles thereof.

Said cap further forms an abutment for one end of a rubber sealing sleeve 9 which embraces the lower portion of the stem 1 and may be circumferentially expanded to snugly fit a bung hole. To effect such an expansion a wing nut 10 is threaded on the stem above the sleeve to exert a regulable pressure endwise against the sleeve, a washer 11 being preferably employed to transmit this pressure, without damage to the sleeve.

To permit the described faucet to receive heavy blows acting axially of the stem, without transmission of the impacts through the casing 2 or valve member 3, there is formed integrally with the stem, at its juncture with the casing, an anvil member 12 which arches above and transversely across the casing, forming with the latter an arcuate slot 13. Said anvil member has a flattened top face for engagement by a hammer or mallet, and fully safeguards the casing and valve member against deformation by such blows, since the blows are transmitted to the stem well below the axis of the casing and valve member. The lower portion of the casing is utilized as a reinforcement for the anvil member at its junctures with the stem, and the anvil member further forms buttresses 13a at such junctures so that the possibility of breakage at said junctures is practically eliminated.

Provision may be made for pumping air into the passage 5 for imposing pressure on a beverage in a container (not shown) equipped with the described faucet. Thus a bore 14 may extend from the passage 5 into one of the buttresses 13a to communicate with an ordinary check-valve air tube 15, such as is commonly used to retain air pressures.

The stem 1, casing 2 and anvil member 12, as described, may be inexpensively formed as a cast unit. Upon detachment of the cap 7, a new sleeve 9 may be readily applied, if necessary. The faucet may be quickly applied or removed, and its construction is a very durable one.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. A beverage faucet comprising a tubular stem forming a beverage inlet, a valve casing formed integrally with one end of said stem and establishing an axis substantially transverse to the stem, a valve member rotatably seated in said casing and ported to control said inlet, a pair of abutments projecting oppositely laterally from the sides of the casing, and an anvil member arched transversely across the casing and joined integrally with said abutments and spaced from the casing between the abutments, and forming an impact portion aligned with the stem.

2. In a faucet comprising a tubular stem, insertable at one end in a container and forming a beverage inlet to the faucet from such container, a casing integrally carried by the other end of the stem, and a valve member rotative in said casing about an axis substantially transverse to the stem, an impact member for use in driving the faucet into the container, said member being integrally connected to the faucet at a point between the inlet end of the stem and the plane, transverse to the stem, determined by the axis of said valve member.

3. A faucet comprising a tubular stem having an inlet substantially at one end thereof, a valve casing rigidly carried by the stem at its other end and establishing an axis substantially transverse to the stem, a valve member rotatably seated in said casing and ported to control a flow through said stem, a pair of abutments projecting oppositely laterally from the sides of the casing, and an anvil member, carried by said abutments, arched transversely across the casing and spaced from the casing between the abutments, and forming an impact portion aligned with the stem.

4. In a beverage faucet, the combination with a stem having a free end and a threaded portion, and a portion of reduced diameter between said end and threaded portion, and interiorly formed with a liquid passage leading from said end, a rubber sleeve embracing said reduced portion, a cap detachably engaging said free end and forming an abutment for one end of the sleeve, said cap having an orifice serving as an inlet to said passage, a nut engaging said threaded portion of the stem and thereby adjustable longitudinally of the stem to compress said sleeve against said cap, and a washer interposed between said nut and sleeve.

JACOB SCHREIER.